US006819505B1

United States Patent
Cassarly et al.

(10) Patent No.: US 6,819,505 B1
(45) Date of Patent: Nov. 16, 2004

(54) INTERNALLY REFLECTIVE ELLIPSOIDAL COLLECTOR WITH PROJECTION LENS

(76) Inventors: William James Cassarly, 6329 Caddies Way, Mason, OH (US) 45040; Robert D. Galli, 6176 Horseshoe Bond La., Las Vegas, NV (US) 88113

( * ) Notice: Subject to any disclaimer, the term of this patent is extended or adjusted under 35 U.S.C. 154(b) by 0 days.

(21) Appl. No.: 10/658,613

(22) Filed: Sep. 8, 2003

(51) Int. Cl.[7] .............................................. G02B 17/00
(52) U.S. Cl. ........................ 359/726; 359/708; 359/718
(58) Field of Search ................................ 359/726, 708, 359/718, 712; 362/800, 327, 329, 294, 157, 308, 560

(56) References Cited

U.S. PATENT DOCUMENTS

| | | | |
|---|---|---|---|
| 1,977,689 A | 10/1934 | Muller .................. 340/815.76 |
| 2,215,900 A | 9/1940 | Bitner ........................ 362/309 |
| 2,224,178 A | 12/1940 | Bitner ........................ 362/337 |
| 2,254,961 A | 9/1941 | Harris ........................ 362/327 |
| 2,254,962 A | 9/1941 | Harris ........................ 362/327 |
| 2,356,654 A | 8/1944 | Cullman .................... 362/223 |
| 2,469,080 A | 5/1949 | Rosin et al. ............... 362/327 |
| 2,908,197 A | 10/1959 | Wells et al. ............ 340/815.76 |
| 4,767,172 A | 8/1988 | Nichols et al. ............ 385/146 |
| 4,770,514 A | 9/1988 | Silverglate .................. 358/728 |
| 5,343,330 A * | 8/1994 | Hoffman et al. ............ 359/708 |
| 5,526,190 A | 6/1996 | Hubble, III et al. ........ 359/719 |
| 5,757,557 A | 5/1998 | Medvedev et al. ......... 359/708 |
| 5,775,792 A | 7/1998 | Wiese ........................ 136/248 |
| 5,813,743 A | 9/1998 | Naka ........................... 362/16 |
| 6,547,423 B2 * | 4/2003 | Marshall et al. ............ 362/333 |
| 6,642,667 B2 * | 11/2003 | Avis ....................... 315/200 A |

* cited by examiner

*Primary Examiner*—Georgia Epps
*Assistant Examiner*—M. Hasan
(74) *Attorney, Agent, or Firm*—Barlow, Jesephs & Holmes, Ltd.

(57) ABSTRACT

The present invention is directed to an optical lens for capturing, homogenizing and transmitting substantially all of the light emitted by a light source, such as a light emitting diode. The optical lens includes a light transmitting structure having a TIR collector portion, a projector portion and a transition portion disposed between the TIR and projector. The structure is characterized by the length of the transition portion being longer than the focal length of the TIR portion. The light source is disposed within a recess in one end of the TIR portion. The light output from the light source is captured by the TIR portion and homogenized to form a uniform, circular near field image within the transition portion. The projector portion then projects the circular near field image into a uniform, circular far field image. The present invention transmits 85% of the light emitted by the light source and produces a uniformly illuminated circular image in the far field of the device.

37 Claims, 7 Drawing Sheets

INTERNALLY REFLECTIVE ELLIPSOIDAL COLLECTOR WITH PROJECTION LENS

BACKGROUND OF THE INVENTION

The present invention relates generally to solid catadioptric lens arrangement. More particularly the present invention relates to a solid catadioptric lens arrangement that incorporates a total internally reflective (TIR) collector portion that encompasses a light source to capture and collimate the light output and a projector lens portion that re-images the collimated light from the collector into the far field of the lens.

It is well known in the art that various combinations of lenses and reflectors can be used in conjunction to change the radiation distribution of the light emitted from a light source. For example, many flashlights available on the market today include a reflector cup around a light source to capture the radiation that is directed from the sides of the light source and redirect it in forward direction, and a convex lens that captures and focuses both the direct output from the light source and the redirected light from the reflector cup. While this is the common approach used in the manufacture of compact lighting devices such as flashlights, this method includes several inherent drawbacks. First, while this arrangement can capture much of the output radiation from the light source, the captured output is only slightly collimated. Light that exits from the light source directly without contacting the reflector surface still has a fairly a wide output angle that allows this direct light output to remain divergent in the far field of the lighting device. Therefore, to collimate this light in an acceptable manner and provide a focused beam, a strong refractive lens must be used. The drawback is that when a lens of this type is used, the image of the light source is directly transferred into the far field of the beam. Second, the light output is not well homogenized using an arrangement of this type. While providing facets on the interior of the reflector surface assists in smearing edges of the image, generally a perfect image of the actual light-generating source is transferred directly into the far field of the beam. In the case of an incandescent, halogen or xenon light source this is an image of a spirally wound filament and in the case of light emitting diodes (LEDs) it is a square image of the emitter die itself. Often this direct transfer of the light source image creates a rough appearance to the beam that is unattractive and distracting for the user of the light. Third, most of these configurations are inefficient and transfer only a small portion of the radiational output into the on axis output beam of the lighting device. Finally, these devices require several separate components to be assembled into mated relation. In this manner, these devices create additional manufacturing and assembly steps that increase the overall cost of the device and increase the chance of defects.

Several prior art catadioptric lenses combine the collector function with a refractive lens in a single device that captures and redirects the radiational output from a light source. U.S. Pat. No. 2,215,900, issued to Bitner, discloses a lens with a recess in the rear thereof into which the light source is placed. The angled sides of the lens act as reflective surfaces to capture light from the side of the light source and direct it in a forward mariner using TIR principals. The central portion of the lens is simply a convex element to capture the on axis illumination of the light source and re-image it into the far field. Further, U.S. Pat. No. 2,254,961, issued to Harris, discloses a similar arrangement as Bitner but discloses reflective metallic walls around the sides of the light source to capture lateral radiation. In both of these devices, the on-axis image of the light source is simply an image of the light generating element itself and the lateral radiation is transferred as a circle around the central image. In other words, there is little homogenizing of the light as it passes through the optical assembly. Further, since these devices anticipate the use of a point source type light element, such as is found in filament type lamps, a curvature is provided in the front of the cavity to capture the divergent on axis output emanating from a single point to create a collimated and parallel output. Therefore, a relatively shallow optical curvature is indicated in this application.

Another prior art catadioptric lens is shown in U.S. Pat. No. 5,757,557. This type collimator is referred to as the "flat top tulip" collimator. In its preferred embodiment, it is a solid plastic piece with an indentation at the entrance aperture. The wall of the indentation is a section of a circular cone and the indentation terminates in a shallow convex lens shape. A light source (in an appropriate package) injects its light into the entrance aperture indentation, and that light follows one of two general paths. On one path, it impinges on the inner (conic) wall of the solid collimator where it is refracted to the outer wall and subsequently reflected (typically by TIR) to the exit aperture. On the other path, it impinges on the refractive lens structure, and is then refracted towards the exit aperture. This is illustrated schematically in FIG. 1A. As stated above, the collimator 10 is designed to produce perfectly collimated light 16 from an ideal point source 12 placed at the focal point of the lens 10. A clear limitation is that when it is used with a real extended source 14 of appreciable surface area (such as an LED chip) as seen in FIG. 1B, the collimation is incomplete and the output is directed into a diverging conic beam that includes a clear image of the chip as a central high intensity region 18 and a secondary halo region 19.

There is therefore a need for a catadioptric lens assembly that collimates the light output from a light source while also homogenizing the output to produce a smoothly illuminated and uniform beam image in the far field of the device.

BRIEF SUMMARY OF THE INVENTION

In this regard, the present invention provides an optical attachment for a light source. In particular, the present invention provides an optical element that is well suited for use with LED light sources, which do not approximate a point source for luminous flux output. The optical attachment includes a recessed area into which the light source is placed. The front of the recess further includes an inner lens area for gathering and focusing the portion of the beam output that is emitted by the light source along the optical axis of the optical attachment. Further, the optical attachment includes an outer reflector area for the portion of the source output that is directed laterally or at large angles relative to the optical axis of the device. The reflector portion and the inner lens direct the light output through a transition region where the light is focused and homogenized. The convex optics at the front of the transition region images this focused and homogenized light into the far field of the device. The present invention also relates to lens assembly as described above for use with other light sources such as incandescent, halogen or xenon, since these types of light sources are also well known in the art and are manufactured to be interchangeable with one another. The invention also relates to a flashlight device that includes a high intensity light source in conjunction with the optical lens described herein.

Accordingly, one of the objects of the present invention is the provision of compact one piece optical assembly that can be used with a high intensity light source to capture both the on axis and lateral luminous output and collimate the output to create a homogenous beam image in the far field of the device. Another object of the present invention is the provision of a one piece optical assembly for use with a high intensity light source that includes a TIR reflector assembly in conjunction with an on axis beam collimator at the input end thereof and a light tube that creates a focused and homogenous beam image for transfer into the far field of the device. A further object of the present invention is the provision of an optical assembly that creates a homogenous and focused beam image on the interior thereof that is further imaged into the far field of the output beam of the device to create a low angle beam divergence. Yet a further object of the present invention is the provision of a flashlight that includes a high intensity light source in combination with a one-piece optical assembly that creates a uniformly illuminated beam image in the far field of the device.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Referring now to the drawings, the unique lens configuration of the present invention is illustrated and generally indicated at 20. The lens 20 can be seen to generally include a total internal reflection (TIR) collector portion 22, a projector lens portion 24 and a transition portion 26 disposed between the collector 22 and the projector 24. As will hereinafter be more fully described, the lens 20 is configured to capture a large amount of the available light from a light source 28, collimate the output and redirect it in a forward fashion to provide a uniformly illuminated circular beam image in the far field of the device. In general the lens 20 of the present invention can be used with any compact light source 28 to provide a highly efficient lens assembly that is convenient and economical for assembly and provides a high quality light output that has not been previously available in the prior art.

Figure 1A:
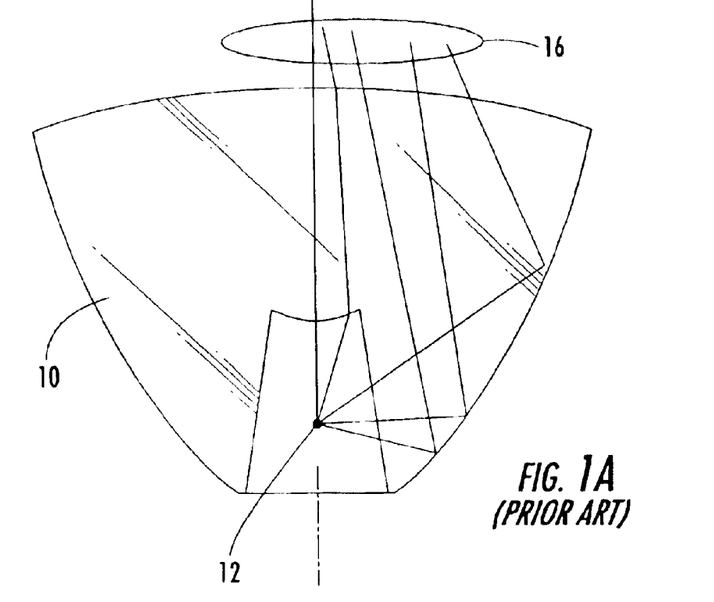
FIG. 1a is a cross-sectional view of a prior art catadioptric lens showing ray traces from a theoretical point source.
Figure 1B:
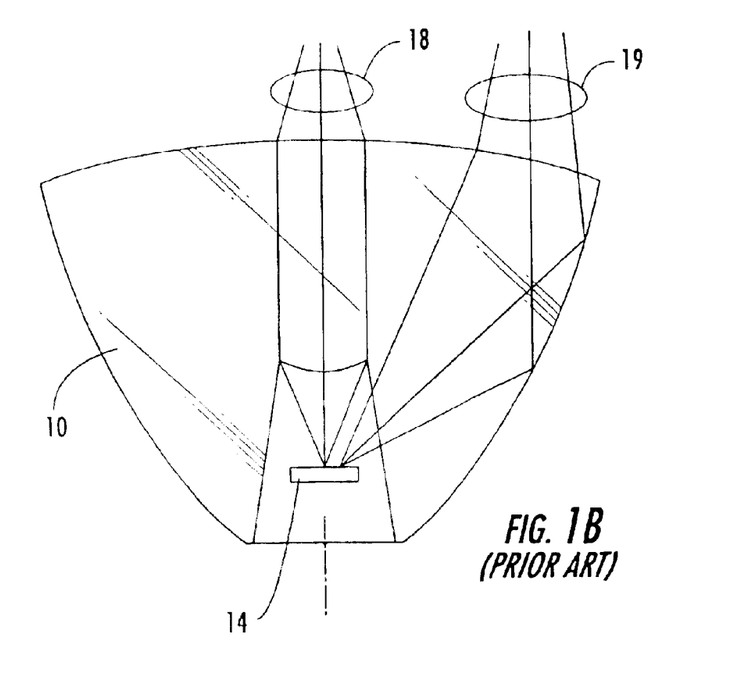
FIG. 1b is a cross-sectional view of a prior art catadioptric lens showing ray traces from a high intensity LED source.

Turning to FIGS. 1a and 1b, as stated above, the catadioptric lenses 10 of the prior are designed to operate with theoretical point sources 12. By following the ray traces shown in FIG. 1a, it can be seen that a highly focused beam output 16 is generated when the output source is a theoretical point source 12. However, while many high intensity light sources 12 theoretically approximate a point source, in practice, when the output energy 16 is captured and magnified, the light source 12 actually operates as an extended light source 14. As can be best seen in FIG. 1b, a high intensity light emitting diode (LED) 14 is shown in combination with the prior art catadioptric lens 10. The resulting ray traces clearly illustrate that the output includes a central hot spot 18 that is essentially a projected image of the emitter chip 14, resulting from the finite size of the chip 14 and a halo region 19 that results from the emissions from the sides of the chip 14.

Figure 2:
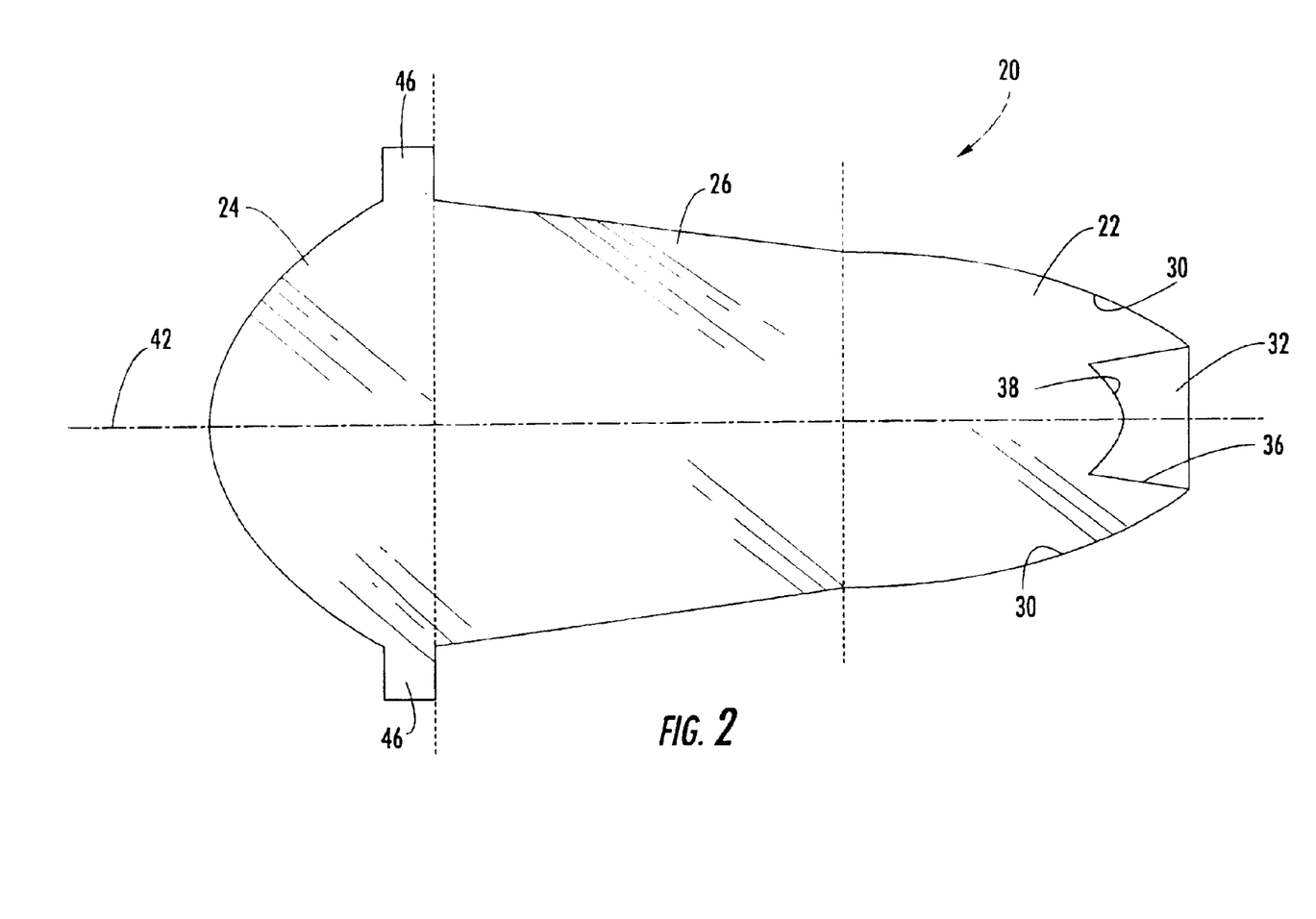
FIG. 2 is a cross-sectional view of the optical lens of the present invention.
Figure 3:
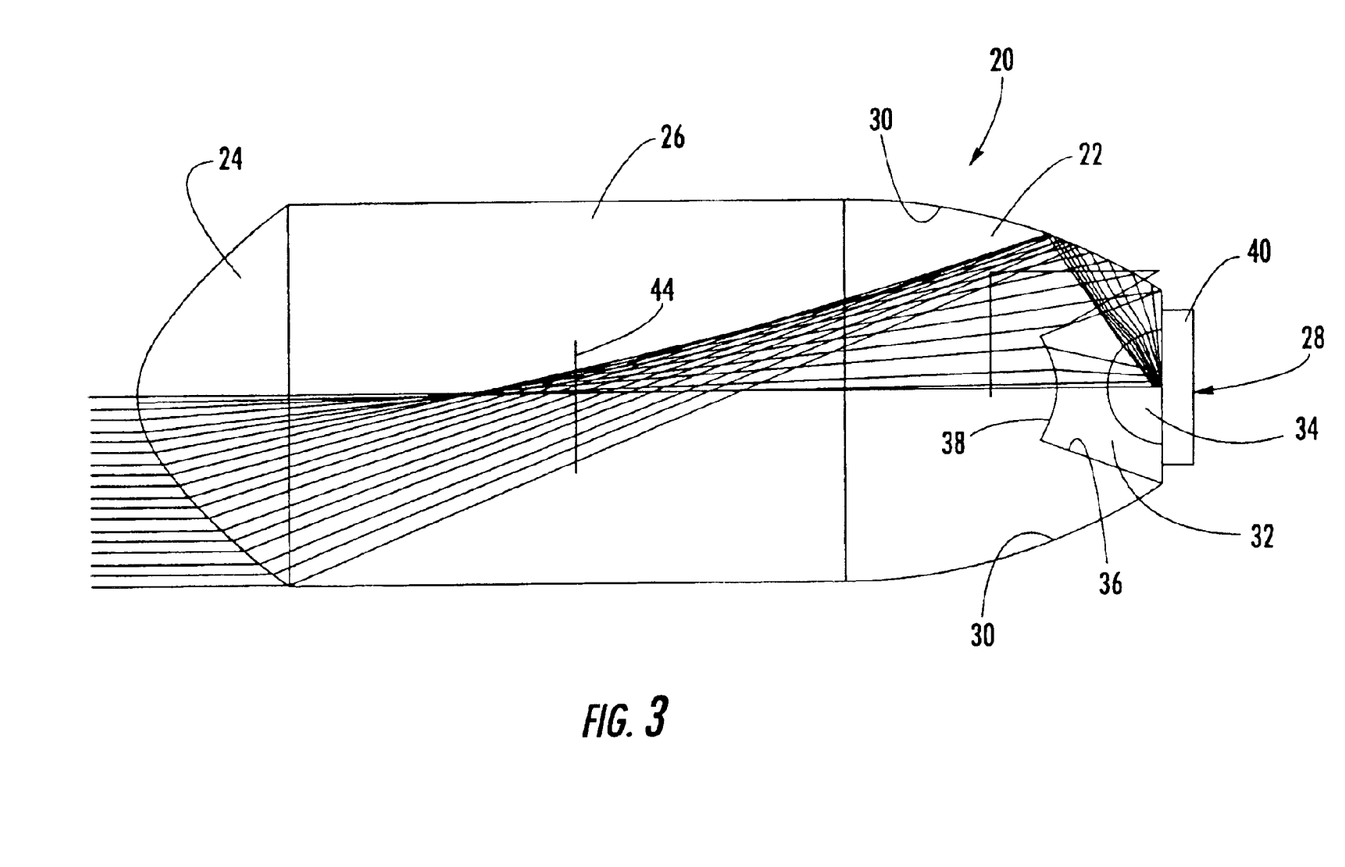
FIG. 3 is a cross-sectional view thereof in conjunction with a light source and ray tracing.

The lens 20 of the present invention is shown in cross-sectional view in FIGS. 2 and 3. The preferred embodiment of the present invention generally includes a TIR collector portion 22, a projector lens portion 24 and a transition section 26 disposed therebetween. The collector portion 22 is configured generally in accordance with the well-known principals of TIR optics. This avoids having to add a reflective coating on the outer surface 30. The collector portion 22 has an outer curved or tapered surface 30 that roughly approximates a truncated conical section. The outer surface 30 may be a straight linear taper, a spherical section, a hyperbolic curve or an ellipsoidal curve. As illustrated in FIG. 2, an ellipsoidal shape has been demonstrated as the most highly efficient shape for use with the preferred high intensity LED light source as will be further described below. The collector 22 includes a recess 32 in the rear thereof that is configured to receive the optical portion 34 of the light source 28. The recess 32 has inner sidewalls 36 and a front wall 38. The inner sidewalls 36 may be straight and parallel or tapered to form a truncated conic section, although some taper is typically required to ensure that the device is moldable. The inner sidewalls 36 act to bend rays toward the collector portion 22 and enhance the collection efficiency of the device. The outer surface 30 and the inner sidewalls 36 are shaped to focus the light from the source within the transition region 26 and near the focal point of the projector lens 24. This generally means that the outer surface 30 will be an asphere, although a true conic shape can be used with only moderate reduction in performance.

The front wall 38 of the recess 32 may be flat or rearwardly convex. In the preferred embodiment, the front wall 38 is formed using an ellipsoidal curve in a rearwardly convex manner. The preferred light source 28 is a high intensity LED device having a mounting base 40, an optical front element 34 and an emitter chip. Generally, LED packages 28 such as described are available in outputs ranging between one and five watts. The drawback is that the output is generally released in a full 180° hemispherical pattern. The light source 28 in accordance with the present invention is placed into the cavity 32 at the rear of the collector 22 and the collector portion 22 operates in two manners. The first operation is a generally refractive function. Light that exits the light source 28 at a narrow exit angle that is relatively parallel to both the optical axis 42 of the lens and the central axis of the light source 28 is directed into the convex lens 38 at the front wall of the cavity 32. As this on axis 42 light contacts the convex surface 38 of the front wall, it is refracted and bent slightly inwardly towards the optical axis 42 of the lens 20, ultimately being relatively collimated and homogenized as it reaches the focal point 44 of the collector portion 22.

The second operation is primarily reflective. Light that exits the light source 28 at relatively high output angle relative to the optical axis 42 of the lens 20 travels through the lens 20 until it contacts the outer walls 30 of the collector section 22. The outer wall 30 is disposed at an angle relative to the light exiting from the light source 28 as described above to be above the optically critical angle for the optical material from which the lens 20 is constructed. The angle is measured relative to the normal of the surface so that a ray that skims the surface is at 90 degrees. As is well known in the art, light that contacts an optical surface above its critical angle is reflected and light that contacts an optical surface below its critical angle has a transmitted component. The light is redirected in this manner towards the optical axis 42 of the lens 10 assembly and the focal point 44 of the collector portion 22. The curve of the outer wall 30 and the curve of the front surface 38 of the cavity 32 are coordinated to generally direct the collected light toward a single focal point 44. In this manner nearly 85% of the light output from the light source 28 is captured and redirected to a homogenized, focused light bundle that substantially converges at the focal point 44 of the collector portion 22 to produce a highly illuminated, substantially circular, light source distribution.

It is important as is best shown in FIG. 3, that a parallel fan of rays traced from the output face of the lens 10 back towards the source 28 will be distributed across nearly the entire face of the source 28. This manner of using a parallel fan of rays and applying them in a reverse manner through the lens 10 and back to the source 28 is important because the distribution of the rays will indicate whether the optical design of the lens will maximize the on axis intensity of the output beam. The prior art was focused on high collection efficiency and no attempt was made to minimize the fraction of the reverse distributed rays that miss the source 28. The disclosed lens 10 device using a combination of a TIR collector 22 and a projector portion 24 provides this important maximum on-axis intensity advantage, especially when one considers that the angle of inner surface 36 is particularly tailored such that these rearward traced rays that ordinarily just skim the surface of the source 28 are now better focused to cover the entire face of the source 28. Further, this aspect of the lens 10 of the present invention is a novel disclosure that is equally useful with respect to a unitary lens 10 or a lens 10 that is formed in two spaced pieces using a collector portion 22 and a projector portion 24 without a transition section 26.

While a specific high intensity LED light source 28 is described, it is clear that the present invention can be used interchangeably with any available light source including but not limited to, incandescent, xenon and halogen. To accommodate the use of these other light sources the curvature of the outer sidewalls 30 and the front wall 38 of the cavity 32 simply must be changed to operate with the geometry of the light-emitting component within the desired light source. While the ellipsoidal geometry shown in the preferred embodiment of the present invention is particularly suited for use with the large horizontal emitter chips in LED light sources 28, other geometry may be selected for use with light sources having different output configurations.

In the lens 20 configuration of the present invention, the placement of the projector portion 24 of the device relative to the collector portion 22 of the device is critical to the proper operation of the lens 20. The projector portion 24 must be placed at a distance from the collector portion 22 that is greater than the focal length 44 of the collector 22. In this manner, the collector 22 can function as described above to focus and homogenize a substantial portion of the light output from the light source 28 into a high intensity, circular, uniformly illuminated near field image. This near field image is produced at a location on the interior of the transition section 26. The near field image is in turn captured by the projector lens 24 and re-imaged or projected into the far field of the device as a uniform circular beam of light as illustrated in FIG. 4*b*. The transitional portion 26 simply serves as a solid spacer to maintain the ideal relationship between the collector portion 22 and the projector portion 24. This configuration eliminates the prior art approach where two separate devices were employed that had to be spaced apart during the assembly process.

The novelty of the present invention is that the entire lens 20 structure is formed in a single unitary lens 20 from either a glass material or an optical grade polymer material such as a polycarbonate. In this manner, a compact device is created that has a high efficiency with respect to the amount of light output that is captured and redirected to the far field of the device and with respect to the assembly of the device. This simple arrangement eliminates the prior art need for combination reflectors, lenses, retention rings and gaskets that were required to accomplish the same function. Further, as can best be seen in FIG. 2, the lens 20 may include an annular ring 46 that lies outside the optically active region of the lens 20. The annular ring 46 forms a mounting surface for installing and retaining the lens 20 in an assembly without affecting the overall operation of the device.

Figure 4A:
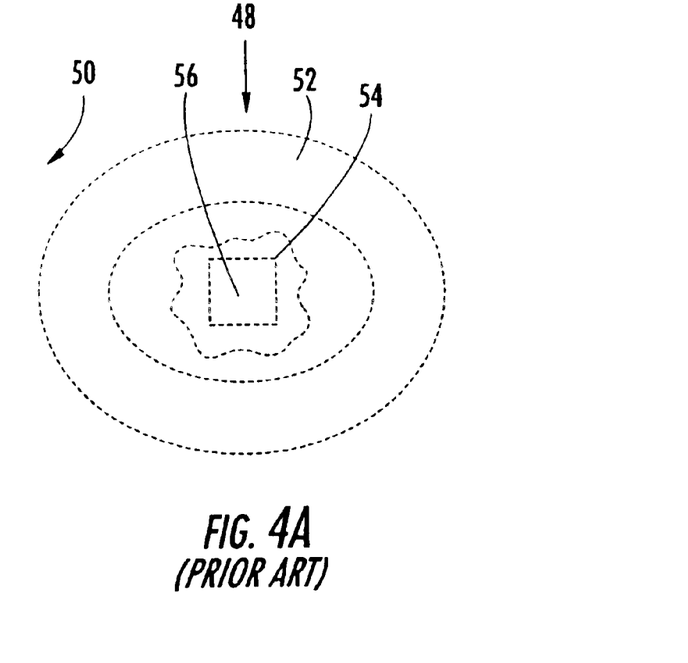
FIG. 4a is a plan view showing the light beam pattern of a prior art lighting assembly.
Figure 4B:
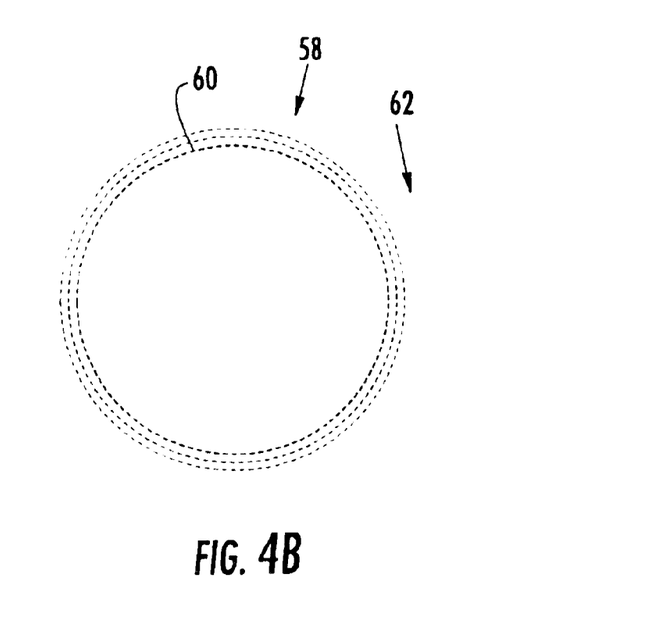
FIG. 4b is a plan view showing the light beam pattern of the present invention.

Turning to FIGS. 4*a* and 4*b*, images from a prior art conventional LED flashlight using a standard piano convex lens (FIG. 4*a*) and from a light source in conjunction with the lens of the present invention (FIG. 4*b*) are shown adjacent to one another for comparison purposes. The image in FIG. 4*a* can be seen to have poor definition between the illuminated 48 and non-illuminated 50 field areas and an uneven intensity of light can be seen over the entire plane of the illuminated field 48. Areas of high intensity 52 can be witnessed around the perimeter of the illuminated field 48 and in an annular ring 54 near the center of the field 48. In addition, a particularly high intensity area of illumination can be seen in a square box 56 at the center of the field 48 and corresponds to the location of the emitter chip within the LED package. In contrast, FIG. 4*b* shows an image from the present invention. Note that the illuminated field 58 has a uniform pattern of illumination across the entire plane and the edge 60 between the illuminated 58 and non-illuminated 62 fields is clear and well defined providing high levels of contrast. The relationship between the LED and optical lens components are critical to the operation of the present invention and in providing the results shown in the illumination field in FIG. 4*b*.

Figure 5A:
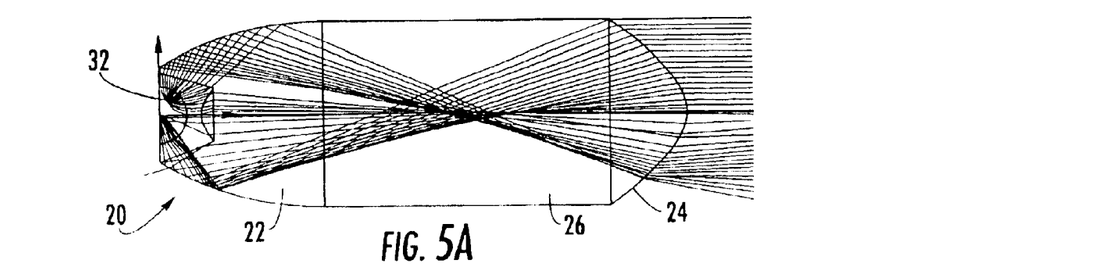
FIG. 5a is a side view of the optical lens of the present invention.
Figure 5B:
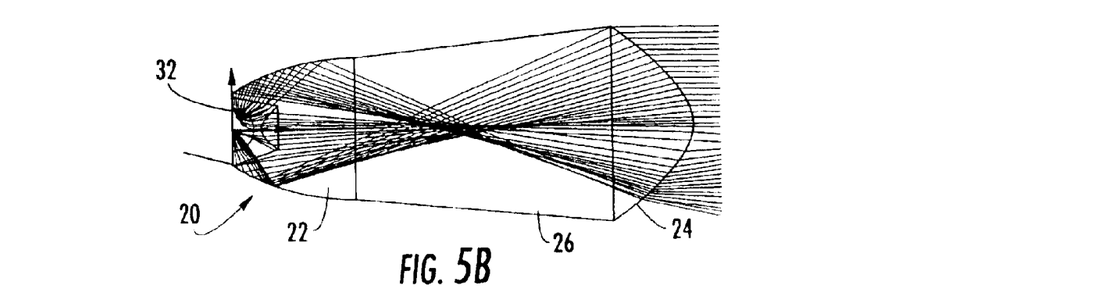
FIG. 5b is a side view of a first alternate embodiment thereof.
Figure 5C:
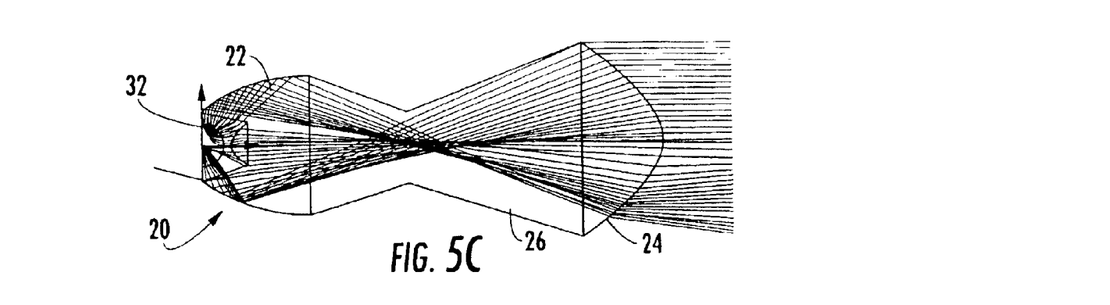
FIG. 5c is a side view of a second alternate embodiment thereof.
Figure 6:
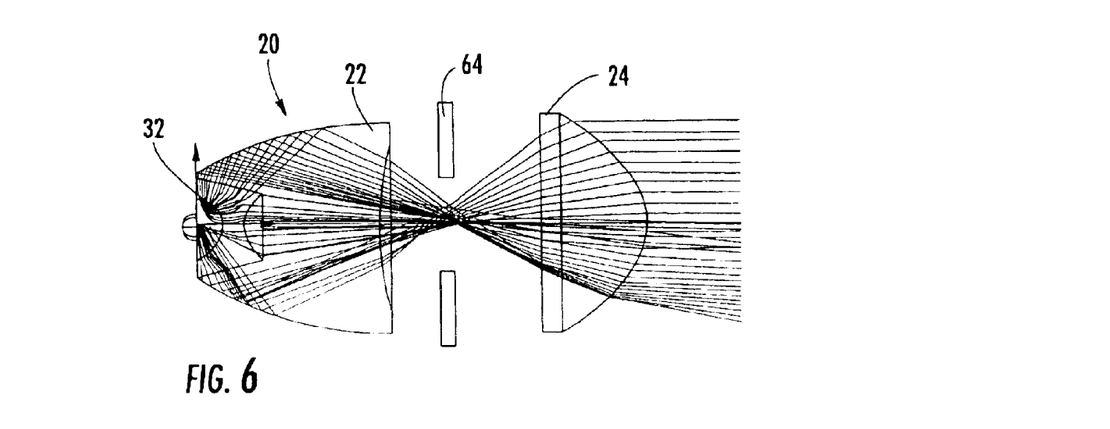
FIG. 6 is a side view thereof shown with an aperture stop.

Since the transition portion 26 of the lens 20 is optically inactive, the shape can vary to suit the particular application for the lens 20. FIGS. 5*a*, 5*b* and 5*c* show several different shapes that the transition section 26 can be formed into without affecting the overall performance of the lens 20. FIG. 5*a* shows that the transition section 26 is simply a straight-sided cylinder. FIG. 5*b* shows the walls having a slight taper. FIG. 5c shows the center of the transition section 26 pinched at approximately the focal point 44 of the collector section 22. In this manner, the edges of the light image may be further controlled and the material required to form the lens 20 can be reduced. FIG. 6 illustrates the use of an aperture stop 64 to further control the shape of the beam image. The stop 64 may form a perfect circle to clip the edges of the beam and make a sharp near field image that is captured and transferred to the far field by the projector portion 24. As can be appreciated this aperture stop 64 could also be formed into many other shapes to create novel beam outputs such as stars, hearts, etc.

Figure 7A:
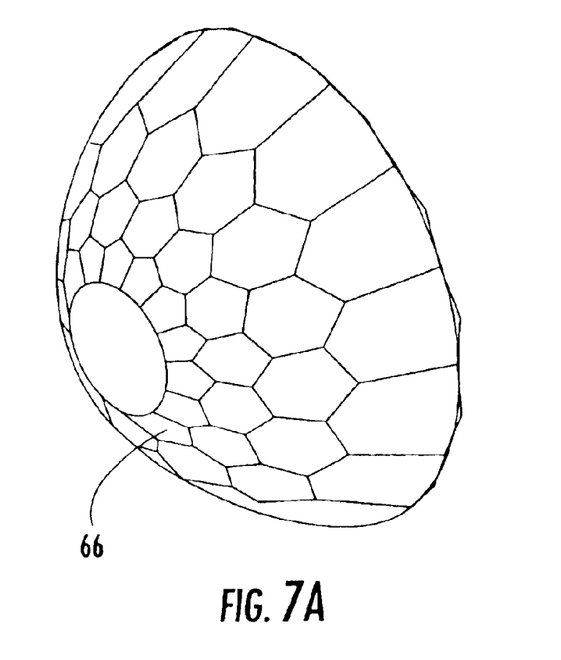
FIG. 7a is a front perspective view of the front surface of the present invention with honeycomb facets shown thereon.
Figure 7B:
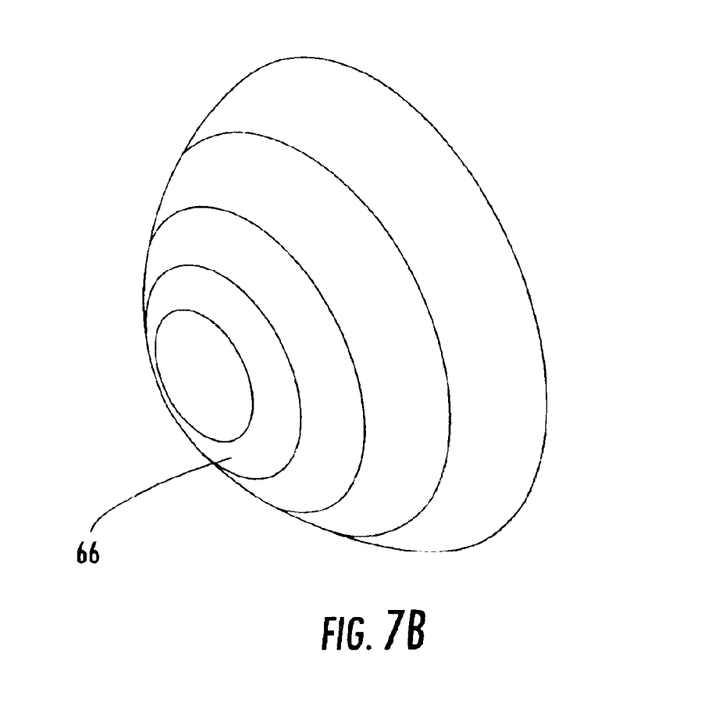
FIG. 7b is a front perspective view of the front surface of the present invention with circular facets shown thereon.

To further homogenize the beam output and create a more uniform far field image, the front face 66 of the projector section 24 may include facets. FIGS. 7a and 7b illustrate two possible facet configurations. FIG. 7a shows a honeycomb facet pattern and FIG. 7b shows a concentric circular facet pattern. As is well known in the art the facets serve to smear the light image thereby having a homogenizing effect on the overall output image that levels out beam hot spots.

Figure 8:
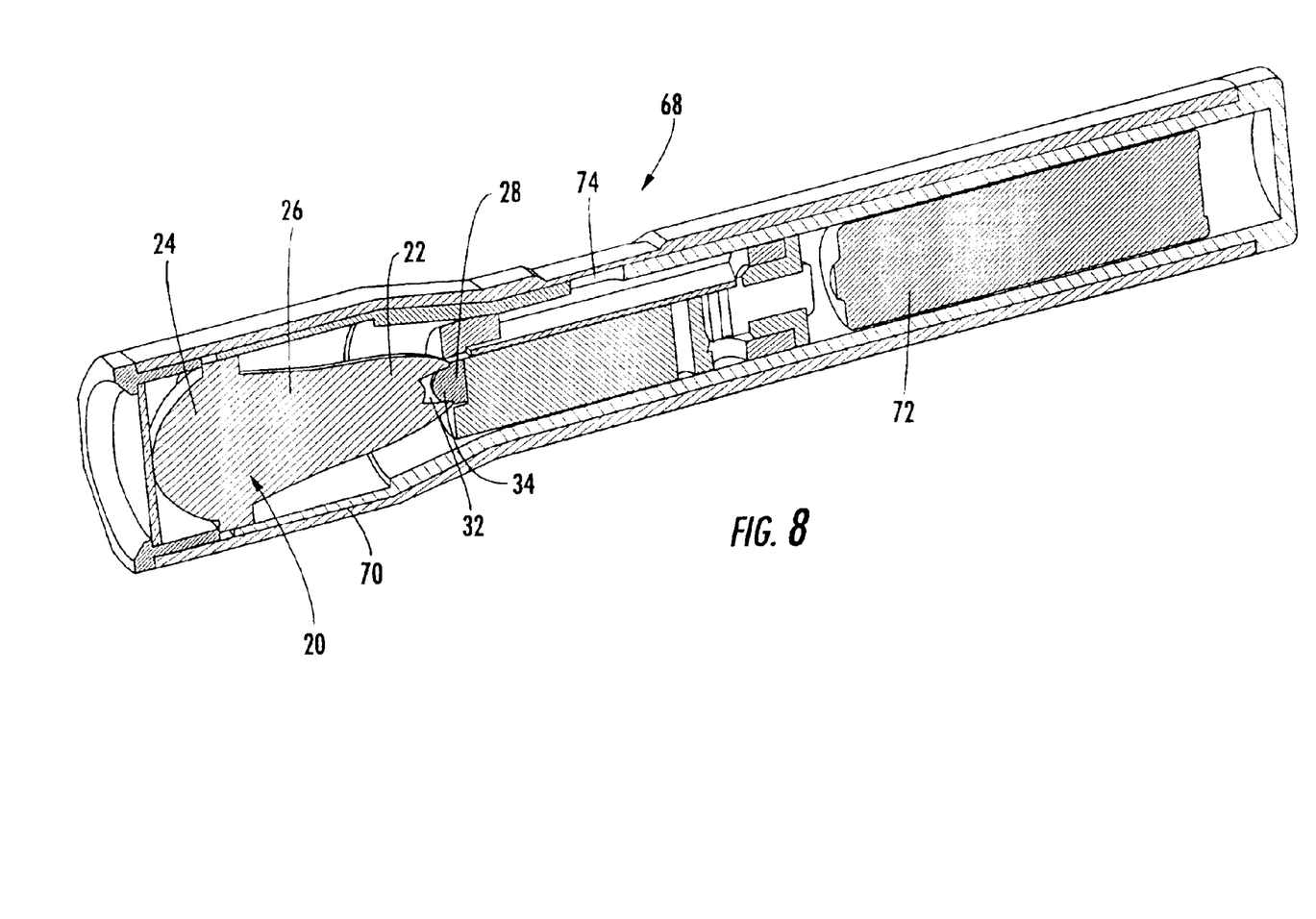
FIG. 8 is a flashlight with the optical lens of the present invention installed therein.

FIG. 8 illustrates the lens 20 of the present invention incorporated into a flashlight 68 assembly. As can be seen the lens 20 of the present invention is installed into the front of a flashlight housing 70. The annular mounting ring 46 serves to retain the lens 20 in its operative position within the housing 70. The light source 28 is installed into the recess 32 of the lens and operates as is described above to provide a uniform, collimated and highly efficient light output beam. The housing 70 further contains a power source 72 such as a battery and a means 74 for selectively completing an electrical circuit between the battery and the light source to energize the device.

It can therefore be seen that the present invention provides a compact lens 20 configuration that includes integral reflector 22 and projector 24 components that cooperate in a highly efficient manner to gather the diffuse light output from a high intensity light source 28. Further, the present invention operates in an efficient manner to collimate and homogenize the light output thereby forming a highly desirable uniform and circular far field beam image that has been previously unknown in the art. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A lens for directing light output from a light source forwardly along an optical axis, said lens comprising:
   a total internal reflection collector portion at a first end thereof, said collector having a focal length;
   a projector portion at a second end opposite said first end; and
   a transition portion extending between said collector portion and said projector portion, said lens having an overall length wherein said overall length is longer than the focal length of said collector portion.

2. The lens of claim 1, wherein said lens is glass.

3. The lens of claim 1, wherein said lens is an optical grade polymer.

4. The lens of claim 1, said collector portion comprising:
   a rear surface;
   an outer side wall; and
   a cavity extending into said collector portion from said rear surface, said cavity having an inner wide wall and a front wall, said light source disposed substantially within said cavity.

5. The lens of claim 4, wherein said outer sidewalls are outwardly tapered between said rear surface and said transition section.

6. The lens of claim 4, wherein said outer sidewalls are hemispherical between said rear surface and said transition section.

7. The lens of claim 4, wherein said outer sidewalls are elliptically curved between said rear surface and said transition section.

8. The lens of claim 4, wherein said front wall is convexly curved rearwardly toward said light source.

9. The lens of claim 1, wherein a front surface of said projector section is convexly curved.

10. The lens of claim 9, wherein said curved front surface of said projector section and said outer side wall of said collector section are faceted.

11. The lens of claim 1, wherein a front surface of said projector section is elliptically curved.

12. The lens of claim 11, wherein said curved front surface of said projector section and said outer side wall of said collector section are faceted.

13. A lighting assembly comprising:
    a lens for directing light output forwardly along an optical axis, wherein said lens includes:
      a total internal reflection collector portion at a first end thereof, said collector having a focal length, said collector having a cavity therein,
      a projector portion at a second end opposite said first end, and
      a transition portion extending between said collector portion and said projector portion, said lens having an overall length wherein said overall length of said lens is longer than the focal length of said collector portion; and
    a light source disposed substantially within said cavity, said light source having a central axis, said light source configured to emit a first portion of light output substantially along said central axis and a second portion of light output substantially divergent from said central axis;
    wherein said collector portion collimates and homogenizes said first and second portions of light output to form a circular, uniformly illuminated near field image within said transition section and said projector section projects said circular image into a far field of said assembly.

14. The lighting assembly of claim 13, wherein said lens is glass.

15. The lighting assembly of claim 13, wherein said lens is an optical grade polymer.

16. The lighting assembly of claim 13, said collector portion comprising:
    a rear surface;
    an outer side wall; and
    said cavity extending into said collector portion from said rear surface, said cavity having an inner side wall and a front wall, said light source disposed substantially within said cavity.

17. The lighting assembly of claim 16, wherein said outer sidewalls are outwardly tapered between said rear surface and said transition section.

18. The lighting assembly of claim 16, wherein said outer sidewalls are hemispherical between said rear surface and said transition section.

19. The lighting assembly of claim 16, wherein said outer sidewalls are elliptically curved between said rear surface and said transition section.

20. The lighting assembly of claim 16, wherein said front wall is convexly curved rewardly toward said light source.

21. The lighting assembly of claim 16, wherein said light source is a light emitting diode.

22. The lens of claim 13, wherein a front surface of said projector section is convexly curved.

23. The lens of claim 22, wherein said curved front surface of said projector son and said outer side wall of said collector section are faceted.

24. The lens of claim 13, wherein a front surface of said projector section is elliptically curved.

25. The lens of claim 24, wherein said curved front surface of said projector section and said outer side wall of said collector section are faceted.

26. A flashlight assembly comprising:
  a housing having a first end and a second end;
  a power source disposed within said first end of said housing;
  a lens for directing light output forwardly along an optical axis disposed in said second end of said housing, wherein said lens includes:
    a total internal reflection collector portion at a first end thereof, said collector having a focal length, said collector having a cavity therein,
    a projector portion at a second end opposite said first end, and
    a transition portion extending between said collector portion and said projector portion, said transition portion having a length wherein said length of said transition portion is longer than the focal length of said collector portion;
  a light source disposed substantially within said cavity, said light source having a central axis, said light source configured to emit a first portion of light output substantially along said central axis and a second portion of light output substantially divergent from said central axis; and
  means for selectively completing an electrical circuit between said power source and said light source to energize said light source.

27. The flashlight assembly of claim 26, wherein said light source is a light emitting diode.

28. A lens assembly for directing light output from a light source forwardly along an optical axis, said lens assembly comprising:
  a total internal reflection collector component, said collector having an input end, an output end and a focal length, wherein said light from said light source is directed to a focal point by said collector; and
  a projector component, said projector component having an input end and an output end, said projector component in fixed spaced relation to said collector component, wherein said projector component images said light at said focal point, wherein parallel rays of light entering said output end of said projector component are refracted by said protector component and reflected and refracted by said collector component to fall entirely on said light source.

29. The lens assembly of claim 28, wherein said collector component and said projector component are glass.

30. The lens assembly of claim 28, wherein said collector component and said projector component are an optical grade polymer.

31. The lens assembly of claim 28, said collector portion comprising:
  a rear surface;
  an outer side wall; and
  a cavity extending into said collector portion from said rear surface, said cavity having an inner side wall and a front wall, said light source disposed substantially within said cavity.

32. The lens assembly of claim 31, wherein said outer sidewalls are outwardly tapered between said rear surface and said output end of said collector.

33. The lens assembly of claim 31, wherein said outer sidewalls are hemispherical between said rear surface and said output end of said collector.

34. The lens assembly of claim 31, wherein said outer sidewalls are elliptically curved between said rear surface and said output end of said collector.

35. The lens assembly of claim 31, wherein said front wall is convexly curved rewardly toward said light source.

36. The lens assembly of claim 28, wherein a front surface of said projector section is convexly curved.

37. The lens of claim 36, wherein said curved front surface of said projector section and said outer side wall of said collector section are faceted.

* * * * *